June 24, 1958     R. J. CLASSEN     2,840,062
INTERNAL COMBUSTION ENGINE SYSTEM
Filed May 17, 1955     3 Sheets-Sheet 1

Raymond J. Classen
INVENTOR.

BY *Clarence A. O'Brien*
*and Harvey B. Jackson*
Attorneys

June 24, 1958   R. J. CLASSEN   2,840,062
INTERNAL COMBUSTION ENGINE SYSTEM
Filed May 17, 1955   3 Sheets-Sheet 2

Raymond J. Classen
INVENTOR.

BY *[signatures]*
Attorneys

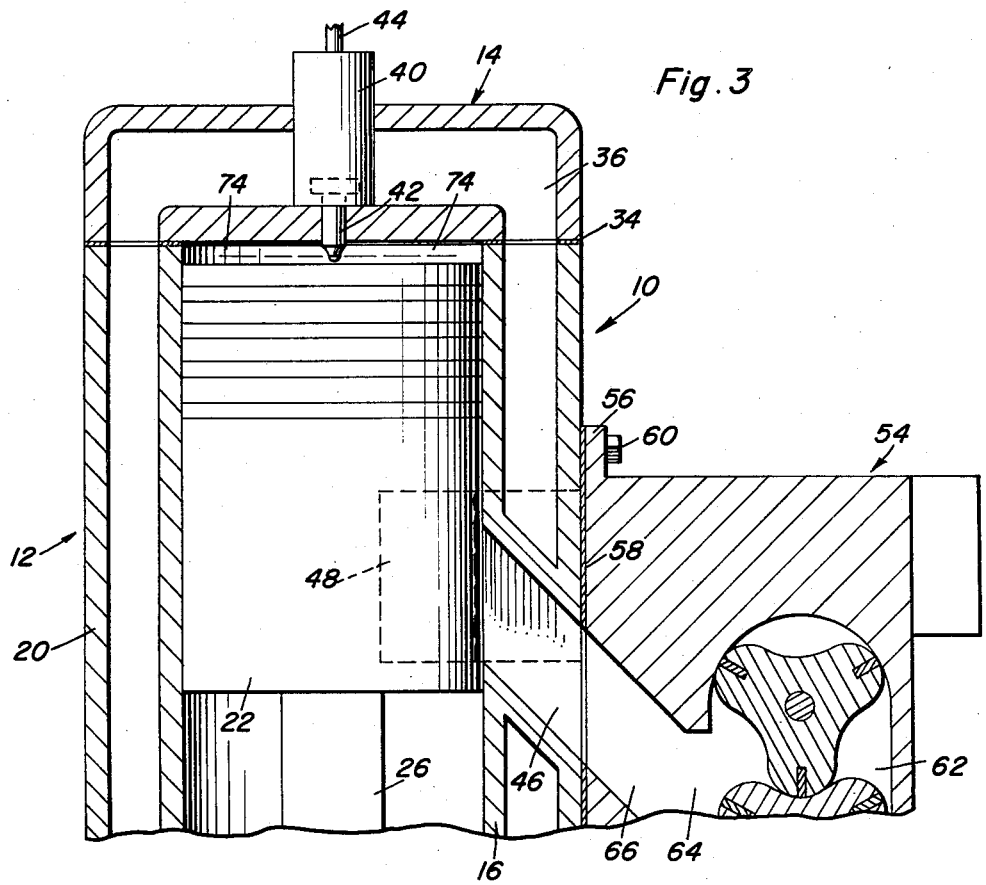
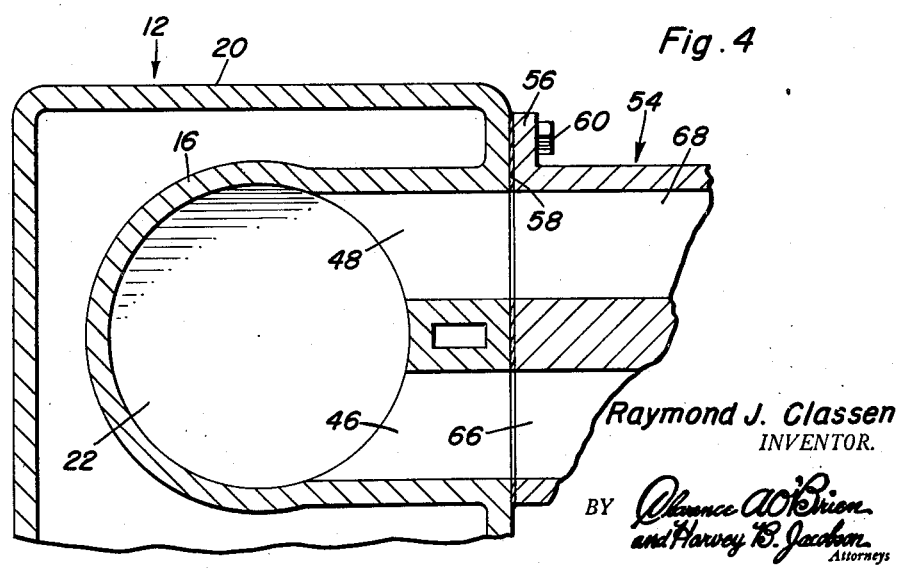

United States Patent Office 2,840,062
Patented June 24, 1958

2,840,062
INTERNAL COMBUSTION ENGINE SYSTEM
Raymond J. Classen, Danforth, Ill.
Application May 17, 1955, Serial No. 508,945
4 Claims. (Cl. 123—65)

This invention relates in general to new and useful improvements in internal combustion engines, and more specifically to improvements in a cylinder port arrangement of an internal combustion engine.

It is the primary object of this invention to provide an improved internal combustion engine wherein each cylinder includes an inlet port and an exhaust port, the ports being so arranged whereby the flow of incoming air is spiral-like and the exhaust gases are compressed and forced downwardly through the center of the cylinder so that there is a substantially complete scavenging effect.

Still another object of this invention is to provide an improved internal combustion engine of the type including inlet and exhaust ports, the ports being so arranged whereby there is a continuous spiral movement of the incoming air, even after the piston has advanced upwardly and closed the inlet port so that the air within the cylinder has a spiral action at the time of the firing of the fuel so that a complete combustion of the fuel is effected.

Still another object of this invention is to provide an improved internal combustion engine of the Diesel type, the combustion engine including an injector having a spray tip forming a generally horizontal spray pattern, the cylinder being so constructed whereby the air therein has a swirling motion during the spraying so that a complete atomization and mixing of the fuel and air is possible, thereby increasing the efficiency of the engine.

A further object of this invention is to provide an improved internal combustion engine system which is of such a nature whereby the output thereof is increased and the fuel consumption is decreased, the engine system incorporating a system of inlet and exhaust ports which is of such a nature whereby a relatively complete scavenging of exhaust gases is possible and at the same time the new air retained within the cylinder continues in a swirling motion at all times including the initial phases of the firing cycle so that a complete combustion of the fuel is possible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal vertical sectional view taken through a two cylinder version of the engine which is the subject of this invention, only the upper portion of the engine being illustrated, one of the pistons being in its lowermost scavenging position and the other of the pistons being in its firing position, the arrangement of the flow of gases within the cylinder wherein the piston is in the scavenging position being shown by arrows;

Figure 3 is a vertical sectional view similar to Figure 2 and shows the piston conveyance to its firing position;

Figure 4 is a fragmentary transverse horizontal sectional view taken substantially upon the plane indicated by section line 4—4 of Figure 2 and shows the plan view of the arrangement of the ports in the cylinder and the connection of the manifold thereto;

Figure 1:
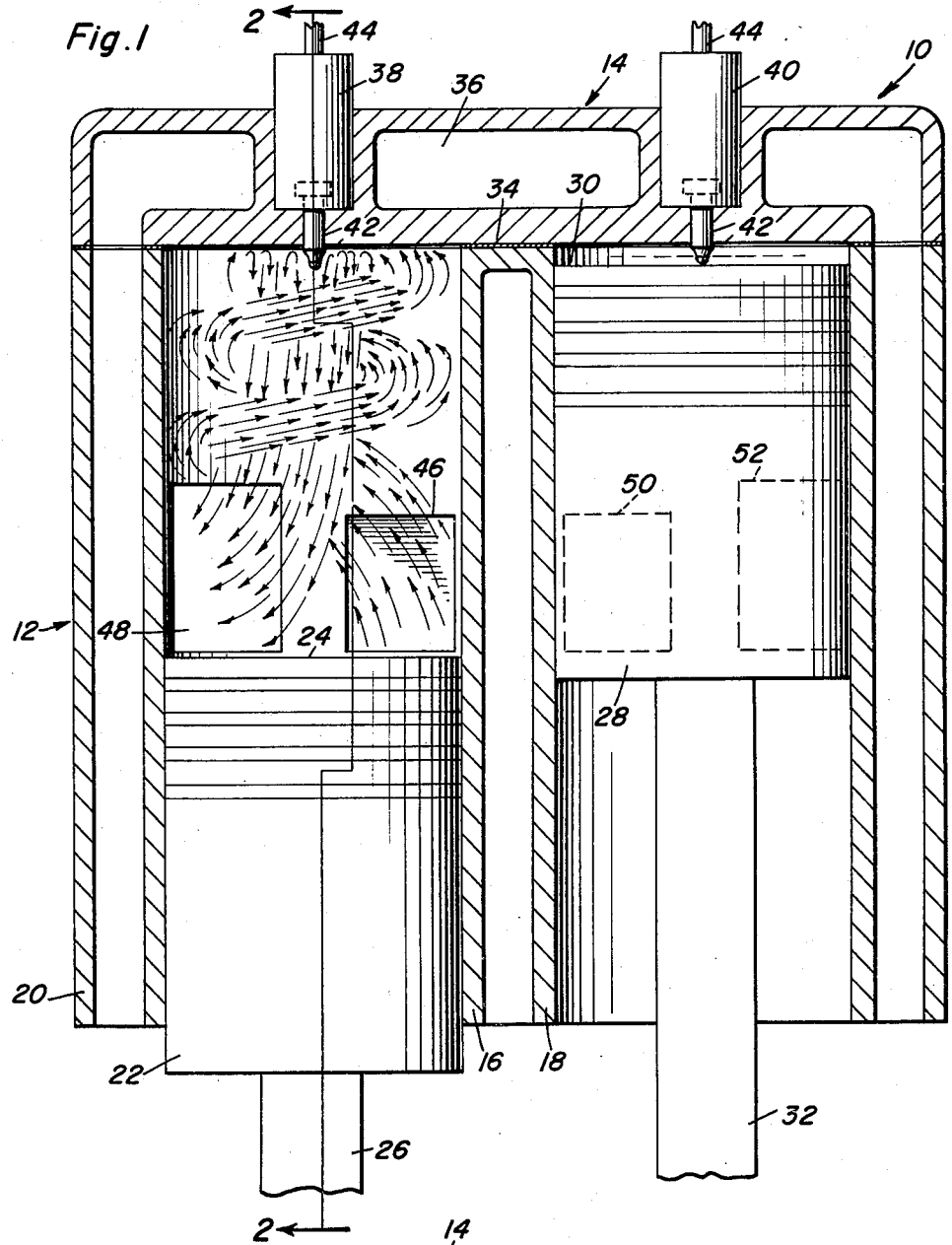

Referring now to the drawings in detail, it will be seen that there is illustrated the upper half of the internal combustion engine which is the subject of this invention, the internal combustion engine being referred to in general by the reference numeral 10. The internal combustion engine 10 includes an upper block section 12 which has the upper end thereof closed by a cylinder head which is referred to in general by the reference numeral 14.

The block 12 has formed therein two cylinders 16 and 18. The cylinders 16 and 18 are surrounded by a conventional type of water jacket 20 to facilitate the cooling thereof. Inasmuch as the cylinders 16 and 18 are identical except for the reversal of port arrangement, as is best illustrated in Figure 1, the cylinder 16 will be primarily described. Of course, the port arrangement could be identical.

Mounted in the cylinder 16 for reciprocatory movement is a conventional type of piston 22 having a flat top 24. The piston 22 is carried by connecting rod 26 which is mounted in the customary manner to a crankshaft (not shown), the lower part of the engine being omitted. Positioned in the cylinder 18 is a piston 28 which is identical to the piston 22. The piston 28 includes a top wall 30 and is carried by connecting rod 32 identical with the connecting rod 26. It is to be noted that the piston 22 is mounted 180° out of phase with the piston 28.

The cylinder head 14 is sealed with respect to the upper surface of the block 12 by a gasket 34. The cylinder head 14 is secured to the block 12 by any suitable type of conventional fastening means, including bolts (not shown). The cylinder head 14 includes a water jacket portion 36 for cooling the same, the water jacket 36 being communicated with the water jacket 20. Carried by the cylinder head 14 in alignment with the cylinders 16 and 18 are injection nozzles 38 and 40, respectively. The injection nozzles 38 and 40 are identical and each includes a spray tip 42 which will be described in more detail hereinafter. The injection nozzles 38 and 40 are connected by fuel lines 44 to a fuel injection pump (not shown) of a conventional type for injecting fuel into the injection nozzles 38 and 40 in timed sequence.

Formed in the block 12 is an inlet port 46 and an exhaust port 48 for the cylinder 16. A similar inlet port 50 and exhaust port 52 are formed in the block 12 for the cylinder 18. It is to be noted that the ports are symmetrical about a center line between the cylinders 16 and 18. Inasmuch as these ports for the cylinders are identical, only the ports 46 and 48 will be described in detail.

Figure 2:
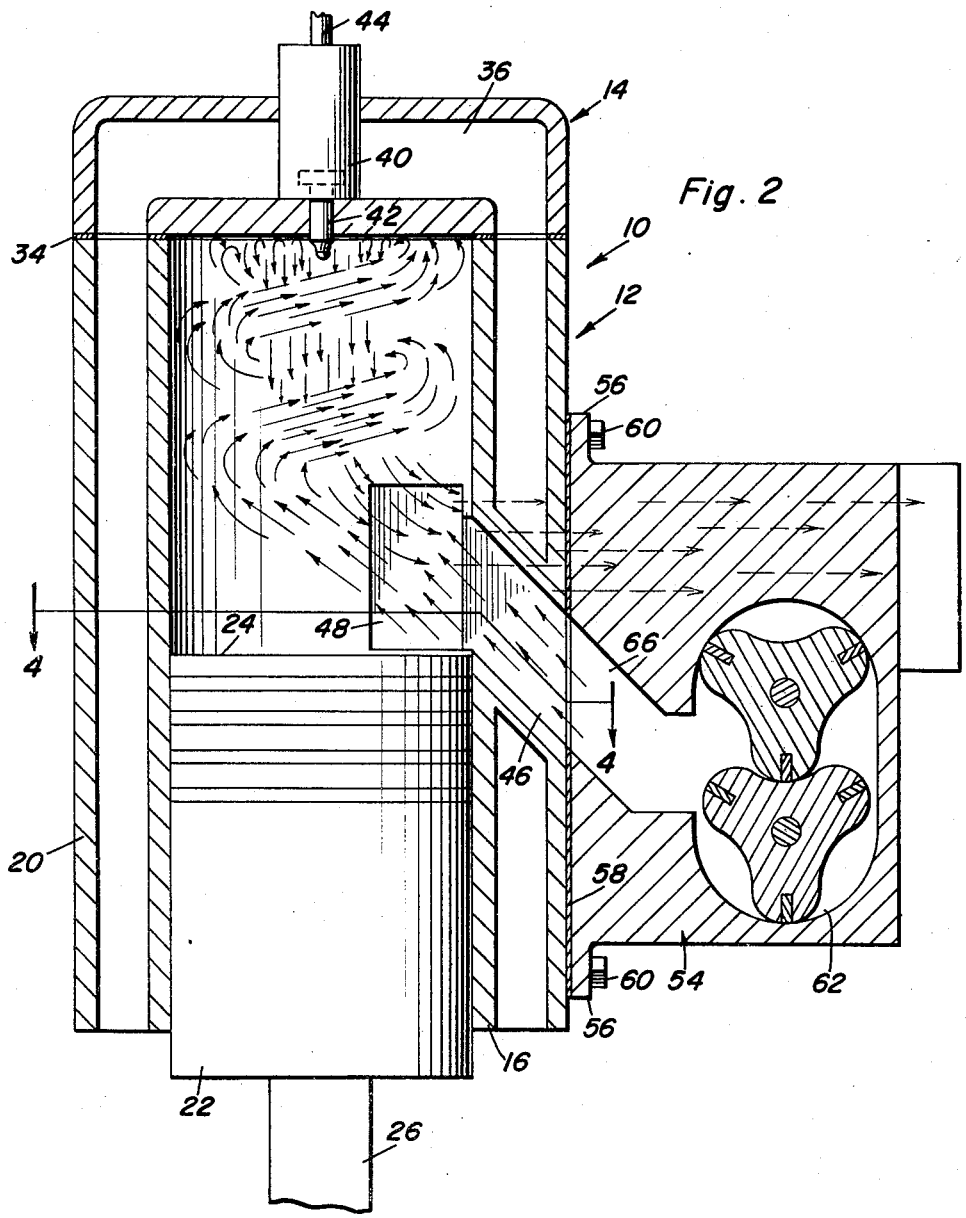
Figure 2 is a transverse fragmentary vertical sectional view taken substantially upon the plane indicated by the section line 2—2 of Figure 1 and shows the general details of the port arrangement of the engine and the flow of gases through such ports.

As best illustrated in Figures 2 and 4, the inlet port 46 is disposed substantially tangential to the interior wall surface of the cylinder 16 at one side thereof. Further, the inlet port 46 slopes upwardly at an angle to the longitudinal axis of the cylinder 16. Because of this particular arrangement of the inlet port 46, air entering into the cylinder 16 is directed upwardly and around the walls of the cylinder 16 in a spiral relation. Since the incoming air is under pressure, in a manner to be described in more detail hereinafter, the incoming air will pass spirally around the outer portion of the cylinder 16 to force all of the exhaust gases towards the center. These exhaust gases are slightly compressed by the incoming air and are forced downwardly through the center of the exterior of the confining incoming air and forced downwardly and outwardly through the exhaust port 48. It is to be noted at this time that the exhaust port 48 is arranged generally tangential to the interior wall surface of the cylinder 16, but substantially 180° from the intake port 26 so that the exhaust gases flow evenly out of the exhaust port 48.

As is best illustrated in Figure 1, the inlet port 46 and exhaust port 48 are generally rectangular in cross-section. Further, the ports 46 and 48 have lower edges thereof lying in a common plane perpendicular to the longitudinal axis of the cylinder 16. The exhaust gases, not being under as much pressure as the incoming air, require a larger outlet, and accordingly, the exhaust port 48 is of a larger size than the inlet port 46. Further, in order to assure the escape of the exhaust gases prior to the uncovering of the inlet port 46, the exhaust port 48 extends above the inlet port 46. The exhaust port 48 is also disposed normal to the longitudinal axis of the cylinder 16, as is best illustrated by the dotted arrows in Figure 2.

In order to assure the flow of gases through the ports 46 and 48, as well as the ports 50 and 52, there is removably secured to one side of the block 12 a manifold which is referred to in general by the reference numeral 54. The manifold 54 includes mounting flanges 56 through which there are passed suitable bolts 60, the bolts 60 passing into the block 12. The manifold 54 is sealed with respect to the block 12 by a suitable gasket 58.

Built into the manifold 54 is a blower 62 of the conventional Rootes type. The blower 62 is provided with an outlet passage 64 which is divided to form a pair of outlet passages 66 which are aligned with the inlet ports 46 and 50. The outlet passages 66 slope upwardly in exact alignment with their respective inlet ports 46 and 50 to ensure the smooth flow of gases into the cylinders 16 and 18 without initial turbulences.

The end portions of the manifold 54 are provided with exhaust passages 68 which are aligned with the exhaust ports 48 and 52. The exhaust passages 68 may have connected thereto a suitable exhaust manifold (not shown). The manifold 54 may be either built as a unit, as illustrated, or with the exhaust and intake portions separate, but closely adjacent each other.

While the manifold 54 has been illustrated and described as having the blower 62 integrally formed therein, it is to be understood that this has been so illustrated and described for purposes of convenience. In normal practice, a conventional type of blower of the same type will be utilized, but the blower will normally be separated from the manifold. However, this is a question of design which is immaterial relative to the particular engine system which is the subject of this invention.

Figure 6:
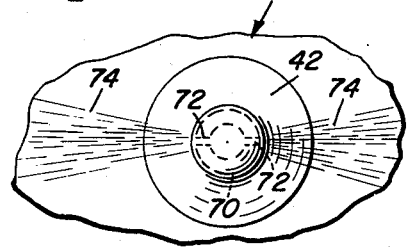
Figure 6 is an enlarged fragmentary horizontal sectional view looking up under the cylinder head and viewing a spray tip during the injection of fuel and shows the general spray pattern of the fuel.
Figure 5:
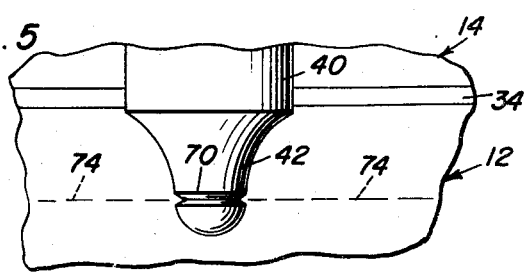
Figure 5 is an enlarged fragmentary elevational view showing the spray tip of the injection nozzle and the general plane of the spray of fuel therefrom.

Referring now to Figures 5 and 6 in particular, it will be seen that the spray tip 42 is of a generally inverted conical shape. Formed adjacent the lower end of the spray tip 42 in the exterior surface thereof is an annular groove 70. The purpose of this groove 70 is to confine the fuel being ejected or sprayed from the spray tip 42 to a generally horizontal pattern. In order to provide for the proper spraying of fuel into the cylinders 16 and 18, the spray tip 42 is provided with at least a pair of diametrically opposite spray passages 72 which are so arranged to give a fan-like spray 74 of fuel.

Because of the particular design of the spray tip 42, fuel may be injected in the cylinders 16 and 18 in the confined spaces between the tops of the pistons 22 and 28 and the underside of the cylinder head 14. Further, inasmuch as the fuel is sprayed parallel to the tops of the pistons, damage to the pistons is prevented.

In the operating cycle of the engine 10, fuel is injected or sprayed into a cylinder from one of the spray tips 42 in the manner best illustrated with respect to cylinder 18 in Figure 1, and the cylinder 16 in Figure 3. With further reference to the cylinder 16, when the fuel is sprayed into the cylinder 16, due to the heat generated within the cylinder 16, it is immediately ignited and the combustion thereof results in the driving of the piston 22 downwardly. As the piston 22 moves downwardly, the upper part of the exhaust port 48 is first uncovered. The exhaust gases then begin to flow out of the port 48. Next, the inlet port 46 begins to be uncovered and the incoming air is forced therein by the pressure formed through the use of the blower 62. As the piston 22 moves downwardly in the cylinder 26, the flow of the gases assumes the pattern illustrated in Figures 1 and 2 with respect to the cylinder 16. Once the piston 22 has reached its bottom dead center position, the pattern of the gases within the cylinder 16 is complete. Then, as the piston 22 begins to move up in the cylinder 16, the ports 46 and 48 are gradually closed. However, due to the pressure of incoming air and the arrangement of the inlet port 46, the fresh air which is disposed within the cylinder 16 continues its swirling motion. This swirling motion continues even after the piston 22 reaches its top dead center position and fuel has been injected therein. Because of the swirling motion which has been imparted to the incoming air, a complete atomization and mixing of the fuel injected with the air is possible. Further, the swirling motion of the burning fuel caused by the swirling gases will result in a more complete combustion of these gases, thereby greatly increasing the efficiency of the engine.

An engine of the type illustrated and described has been built and tested with excellent performance. The data on this engine is as follows:

| | |
|---|---|
| Two-stroke cycle | Diesel |
| Cylinders | Two |
| Bore _____in__ | 4\~11/16 |
| Stroke _____in__ | 6¾ |
| R. P. M. | 1000 |
| B. M. E. P. _____p. s. i__ | 72 |
| Shaft torque (max.) _____lb.-ft__ | 236 |
| H. P. | 40 plus |
| Blower pressure _____p. s. i__ | 5 |
| Fuel injection pressure _____p. s. i__ | 3000–3500 |
| Fuel consumption _____lb./hp./hr__ | .25 |

It is to be noted that the fuel consumption is extremely low, and is believed to be better than that heretofore possible with an engine of this type.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an internal combustion engine, a cylinder, an inlet port in said cylinder, an exhaust port in said cylinder, a piston mounted in said cylinder for reciprocatory movement, said piston alternately covering and uncovering said ports to control the flow of gases into and out of said cylinder, said inlet port being disposed generally tangential to said cylinder, said inlet port having a flow axis disposed at an angle to the longitudinal axis of the cylinder and opening into the cylinder in a direction facing away from said piston in its bottom dead center position, said exhaust port being disposed generally tangential to said cylinder and having a flow axis which is normal to said longitudinal axis, said inlet and exhaust ports being disposed in side-by-side relation in one-half of the circumferential extent of said cylinder, the other half of said cylinder being imperforate.

2. In an internal combustion engine, a cylinder, an inlet port in said cylinder, an exhaust port in said cylinder, a piston mounted in said cylinder for reciprocatory movement, said piston alternately covering and uncovering said ports to control the flow of gases into and out of said cylinder, said inlet port being disposed generally tangential to said cylinder, said inlet port having a flow axis disposed at an angle to the longitudinal axis of the cylinder and opening into the cylinder in a direction facing away from said piston in its bottom dead center position, said exhaust port being disposed generally tangential to said cylinder and having a flow axis which is normal to said longitudinal axis, said inlet and exhaust ports being disposed in side-by-side relation in one-half of the circumferential extent of said cylinder, the other half of said cylinder being imperforate, said flow axes lying in planes disposed parallel to said longitudinal axis and to each other.

3. In the internal combustion engine of claim 1, said inlet port forming the sole passage for the entrance of air into said cylinder, and said exhaust port forming the sole means of educting gases from said cylinder.

4. In the internal combustion engine of claim 2, said inlet port forming the sole passage for the entrance of air into said cylinder, and said exhaust port forming the sole means of educting gases from said cylinder.

References Cited in the file of this patent

UNITED STATES PATENTS

| | | |
|---|---|---|
| 1,875,528 | Udale et al. | Sept. 6, 1932 |
| 2,034,093 | Behrandt | Mar. 17, 1936 |
| 2,105,717 | Burn | Jan. 18, 1938 |
| 2,111,282 | Edwards | Mar. 15, 1938 |
| 2,699,765 | Taylor | Jan. 18, 1955 |

FOREIGN PATENTS

| | | |
|---|---|---|
| 46,161 | Norway | Feb. 25, 1929 |
| 541,963 | Great Britain | Dec. 19, 1941 |
| 590,851 | Great Britain | July 30, 1947 |